Feb. 23, 1960 A. A. THIELE 2,926,347
MARCHING BAND METRONOME
Filed Sept. 18, 1957
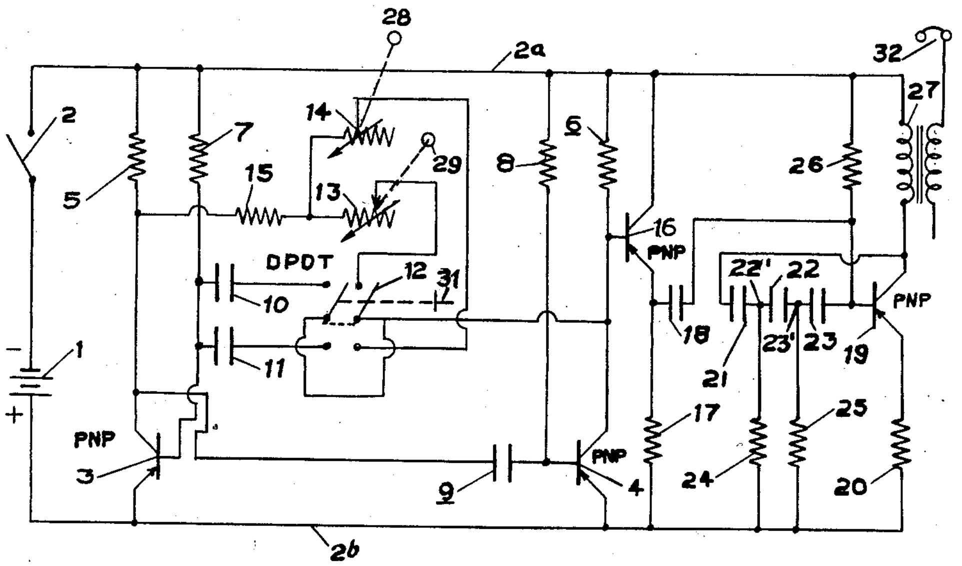
INVENTOR.
Alfred A. Thiele
BY 2,926,347
Patented Feb. 23, 1960

2,926,347

MARCHING BAND METRONOME

Alfred A. Thiele, Louisville, Ky.

Application September 18, 1957, Serial No. 684,823
3 Claims. (Cl. 340—384)

This invention relates generally to metronomes and more particularly to an improved circuit and structure of a metronome employing semi-conductor devices.

An object of this invention is to provide a metronome which may be built in pocket size so that it can be conveniently used in marching bands by the bass drummer. In a marching band, the bass drummer controls the tempo of the whole band so that a device which helps the bass drummer keep the correct tempo hold the entire band at the correct tempo.

A further object of this invention is to provide a transistor metronome which exhibits a minimum change in rate from changes in supply voltage and temperature changes.

A further object of this invention is to make a metronome which will operate with low gain economy transistors.

Another object of the present invention is to provide a metronome which will operate with low current drain from batteries which are easily obtainable in drug stores, etc.

A further object is to provide a metronome which will produce a sound loud enough to be heard over a bass drum and at the same time operate on low voltage.

Another object of my invention is to provide a metronome which has no moving parts.

In general, the subject device comprises a multi-range selectively tuned multivibrator which keys an audio output phase shift oscillator through suitable amplification means to produce audible tuned output pulses. When used in the form of a metronome these tuned output pulses provide the desired cadence count for the musicians in a marching band or the like.

With these and other objects and advantages in view, the invention consists of the new and novel combination, construction, and arrangement of parts as hereinafter more fully described, set forth in the claims appended hereto, and disclosed in the accompanying drawings forming part hereof, wherein:

The figure shows the circuit diagram of the metronome.

Referring to the drawing, a battery 1 comprises the power supply which is connected by means of a switch 2 across the emitter and collector circuits of a multi-range multivibrator. A common negative bus **2*a* and a common positive bus 2*b*** provide power connections for the entire circuit.

The multi-range multivibrator comprises transistors 3 and 4 having load resistors 5 and 6, respectively, connected from the common negative bus **2*a* to the collectors. A common emitter circuit is provided by direct connection of the emitters to the common positive bus 2*b*. The base circuits of transistors 3 and 4 are connected through bias resistors 7 and 8, respectively, to the common negative bus 2*a***.

The rate controlling circuits for the multivibrator comprise a plurality of capacitors 9, 10 and 11 selectively connected in combination with a plurality of dropping resistors 13, 14 and 15 for providing a plurality of frequency ranges for the multivibrator. Resistors 13 and 14 are made variable for selective frequency variation within the ranges available.

The collector of the first transistor 3 is connected through a capacitor 9 to the base of the second transistor 4. The collector of the second transistor 4 is connected to the base of the first transistor 3 through a range selecting switch 12 and either capacitor 10 or 11, depending on the position of range switch 12. The variable dropping resistors 13 and 14 are connected to the rate determining capacitors 10 and 11, respectively, through the range switch 12 on one side and are connected on their other side to a common dropping resistor 15 which, in turn, is connected to the collector of the first transistor 3.

The operation of the multivibrator is well known in the art, however the following features are noteworthy. The absence of D.C. stabilizing networks in the emitter circuit minimizes the effects of changes in supply voltage in causing rate drift. The bias resistors 7 and 8 are adjusted so that the metronome gives the same rate at two different temperatures. For example, when the resistors are adjusted to give a common rate at two temperatures which are close together such as body temperature and room temperature the metronome will give a nearly constant beat in the region between body and room temperatures. With this arrangement the metronome may be kept in an inside pocket to give a constant beat over a wide range of external temperatures. The output of the multivibrator which is used as a keying signal, is taken from the collector of the second transistor 4 and fed to the base of a third transistor 16, forming an element of an emitter follower stage. The collector of the third transistor 16 is directly connected to the common negative bus **2*a*, while the emitter is connected through a dropping resistor 17 to the common positive bus 2*b***. The emitter follower stage provides a high input impedance to the multivibrator output to prevent overloading. It provides a power amplification for the multivibrator output and isolates the multivibrator from the remainder of the circuit.

The output of the emitter follower is fed from the emitter of the third transistor 16 through an output coupling capacitor 18 to the base of a fourth transistor 19, which with the associated circuit components, now to be described, comprises an audio output phase shift oscillator.

The base of the fourth transistor 19 is maintained at the desired operating level by means of a bias resistor 26, which is connected between the base and the common negative bus **2*a*. A stabilizing resistor 20 is connected between the emitter of the fourth transistor 19 and the common positive bus 2*b*. An R–C phase shift network is provided between the base and collector of the fourth transistor 19** for producing the desired audio output in response to the keying signal from the emitter follower or amplification stage.

The phase shift network comprises a capacitor 23 connected on one side to the base of the fourth transistor 19 and on its other side to a common point 23′. A resistor 25 is connected to the common positive bus **2*b*. A capacitor 22 is connected on one side to the common point 23′ and on its other side to a common point 22′, which is connected to the common positive bus 2*b* through a resistor 24 and to the collector of the fourth transistor 19 through a capacitor 21. An audio output transducer comprising an iron core inductor 27 is connected between the collector of the fourth transistor 19 and the common negative bus 2*a***.

The variable rate resistors 13 and 14 may be controlled by tuning knobs 28 and 29 adjacent suitable range scales, not shown. The range selector switch 12 may be controlled by a push-button operator 31 or like suitable switch operator means.

The operation of the subject device is as follows:

Range selector switch 12 is set at the desired range position. Variable rate resistors 13 or 14 are then adjusted by the tuning knobs 28 and 29 to tune or control the frequency of the multivibrator output signal, within the range setting of the range selector switch 12, in conjunction with the rate controlling capacitors 10 and 11, respectively. Upon closing the power switch 2 the multivibrator is actuated and produces an output or keying signal, which is fed to an isolation or amplification stage. The amplification stage relays the keying signal from the multivibrator and keys the audio output phase shift oscillator to provide tuned audible output pulses at the output transducer 27. Suitable means may be operatively associated with the output transducer 27 to convey the output pulses to the ear of the user. An example is the earphone 32.

It is to be understood that the specific modification of the subject device as described and shown above is for purposes of example only and is not to be construed as the sole form of the subject device and thereby limit the scope of the appended claims.

What is claimed is:

1. In a metronome, a selectively tuned audio output phase shift oscillator circuit comprising a power supply, a keying signal generating circuit, an amplification stage at the output side of said keying signal generating circuit for isolating said keying signal generating circuit from the input of the audio oscillator and for amplifying and relaying the keying signal output of said keying signal generating circuit to the input of the audio oscillator, wherein said keying signal generating circuit comprises a selectively tuned multi-range multivibrator for tuning the keying signal to a selected frequency and thereby tuning the audio output of said phase shift oscillator; said multivibrator comprising a first transistor and a second transistor, said first transistor and said second transistor having a common emitter circuit, said first transistor having its collector capacitance coupled to the base of said second transistor, said second transistor having its collector connected to a multi-range selector switch, said switch being selectively coupled to the base of said first transistor through one of a plurality of capacitors selected by the particular setting of said multi-range switch and selectively coupled to the collector of said first transistor through one of a plurality of variable rate determining resistors selected by said multi-range switch position whereby the position of said multi-range selector switch and the setting of said variable rate determining resistors selectively tunes the frequency of oscillation of said multivibrator.

2. In a metronome, a multi-range selectively tuned multivibrator comprising a first transistor and a second transistor, said first transistor and said second transistor having a common emitter circuit, said first transistor having its collector capacitance coupled to the base of said second transistor, said second transistor having its collector connected to a multi-range selector switch, said switch being selectively coupled to the base of said first transistor through one of a plurality of capacitors selected by the particular setting of said multi-range switch and selectively coupled to the collector of said first transistor through one of a plurality of variable rate determining resistors selected by said multi-range switch position whereby the position of said multi-range selector switch and the setting of said variable rate determining resistors selectively tunes the frequency of oscillation of said multivibrator.

3. In a metronome, a selectively tuned audio output phase shift oscillator circuit keyed from an external source comprising a keying signal amplification stage and a phase shift oscillator stage, said amplification stage comprising a transistor emitter follower having its base connected to the external keying source to isolate said external source from said oscillator stage and having its emitter coupled through a capacitor to the base of a second transistor in said phase shift oscillator stage, said oscillator stage comprising said second transistor having a resistance-capacitance phase shift network connected between the base and collector of said second transistor and an audio output transducer connected in the collector circuit of said second transistor.

References Cited in the file of this patent

UNITED STATES PATENTS

| | | |
|---|---|---|
| 2,126,682 | Hammond | Aug. 9, 1938 |
| 2,464,252 | Moore | Mar. 15, 1949 |
| 2,772,359 | Modiano | Nov. 27, 1956 |
| 2,788,449 | Bright | Apr. 9, 1957 |
| 2,850,630 | Prugh | Sept. 2, 1958 |

OTHER REFERENCES

Article: "Transistorized Phase-Shift Oscillator," page 108 of Radio and Television News, for April 1956.

Article: "Junction Transistor Circuit Applications," by Sulzer, page 173 of Electronics for August 1953.

Transistor Circuit Handbook by Garner; copyrighted 1956; pages 89 (Figures 5–10(*c*)) and 310–11 (Figures 10–16 and 10–17).